US010718381B2

(12) United States Patent
Bassett et al.

(10) Patent No.: US 10,718,381 B2
(45) Date of Patent: Jul. 21, 2020

(54) RELEASE BEARING COVER AND WASHER SEAL

(71) Applicant: Eaton Intelligent Power Limited, Dublin (IE)

(72) Inventors: Michael L. Bassett, Auburn, IN (US); Timothy Allmandinger, Roanoke, IN (US); Robb E. Grostefon, Fort Wayne, IN (US)

(73) Assignee: Eaton Intelligent Power Limited, Dublin (IE)

( * ) Notice: Subject to any disclaimer, the term of this patent is extended or adjusted under 35 U.S.C. 154(b) by 43 days.

(21) Appl. No.: 16/192,305

(22) Filed: Nov. 15, 2018

(65) Prior Publication Data
US 2019/0145464 A1 May 16, 2019

Related U.S. Application Data

(60) Provisional application No. 62/586,838, filed on Nov. 15, 2017.

(51) Int. Cl.
F16C 33/66 (2006.01)
F16D 13/74 (2006.01)
F16D 23/14 (2006.01)
F16J 15/16 (2006.01)

(52) U.S. Cl.
CPC ...... F16C 33/6607 (2013.01); F16C 33/6625 (2013.01); F16C 33/6681 (2013.01); F16D 13/74 (2013.01); F16C 2361/43 (2013.01); F16D 23/148 (2013.01); F16J 15/164 (2013.01)

(58) Field of Classification Search
CPC .. F16C 33/6607; F16C 33/78; F16C 33/7843; F16C 33/2361; F16C 33/43; F16D 13/74; F16D 23/148; F16J 15/3256
See application file for complete search history.

(56) References Cited

U.S. PATENT DOCUMENTS

| 8,672,114 | B2 | 3/2014 | Davis et al. | |
|---|---|---|---|---|
| 8,689,961 | B2 | 4/2014 | Jennings et al. | |
| 2003/0213671 | A1* | 11/2003 | DePiazza | F16D 23/148 192/98 |
| 2008/0196993 | A1* | 8/2008 | McCutcheon | F16D 23/14 192/98 |

* cited by examiner

Primary Examiner — Phillip A Johnson
(74) Attorney, Agent, or Firm — Mei & Mark, LLP

(57) ABSTRACT

A cover comprises a substrate and a grease lid. The substrate comprises a main body comprising a branched grease pathway, a locating side comprising a grease supply port, and a lubricating side comprising a plurality of grease ports. The grease lid constrains the branched grease pathway and is configured so that when grease enters the locating side grease supply port, the grease traverses the branched grease pathway and exits the grease ports.

20 Claims, 11 Drawing Sheets

RELEASE BEARING COVER AND WASHER SEAL

FIELD

This application provides lubrication improvements for a release bearing cover and also provides a washer seal for use with the release bearing cover.

BACKGROUND

Release bearings can be serviced at intervals to provide lubrication for an axle such as the transmission axle or an input shaft coupling to the transmission axle. The shaft or axle passes through the release sleeve. The lubrication can flow near the bearing seal of the bearing assembly. However, it is desirable to keep the area near the bearing seal free of the axle lubrication. Though the lubrication is intended for the transmission axle, the lubrication in this instance can be restricted to one compatible with the release bearing assembly, such as one compatible with the grease slinger.

SUMMARY

The methods and devices disclosed herein improve the art by way of a cover comprising a substrate and a grease lid. The substrate comprises a main body comprising a branched grease pathway, a locating side comprising a grease supply port, and a lubricating side comprising a plurality of grease ports. The grease lid constrains the branched grease pathway and is configured so that when grease enters the locating side grease supply port, the grease traverses the branched grease pathway and exits the grease ports.

A release bearing assembly comprises the cover. A bearing housing comprises a connection and a pathway through the connection for connecting to an injection nozzle. A bearing assembly is within the bearing housing. The grease supply port of the cover connects to the connection pathway. The cover seals the bearing assembly within the bearing housing so that when the grease enters the locating side grease supply port and exits the grease ports, the grease does not lubricate the bearing assembly.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
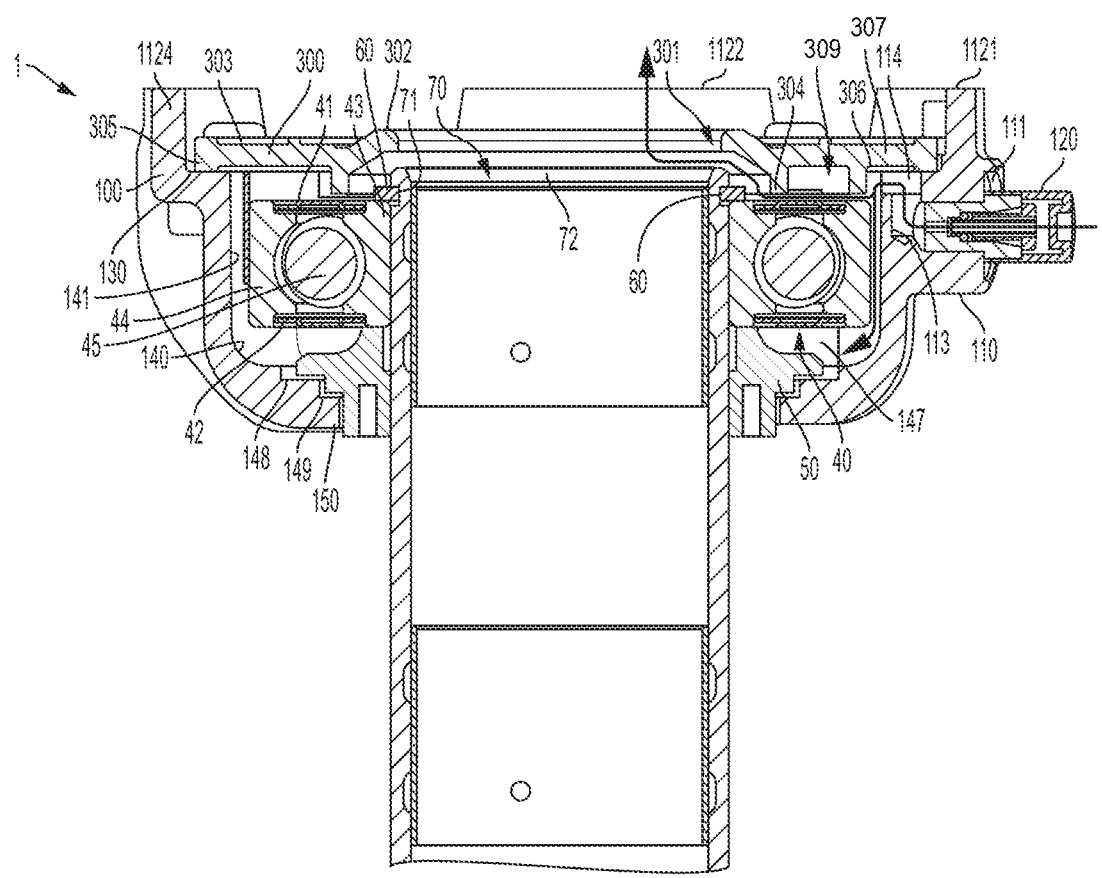
FIG. 1 is a cross-section view of a release bearing assembly.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

The disclosed release bearing cover 300, 1300, 2300 makes it possible to use a lubricating grease compatible with a transmission axle, and the grease can be pushed through the cover on a release bearing assembly 1, 2, 3 to lubricate the transmission axle. Then, one lubrication compatible with a bearing assembly 40 of the release bearing assembly 1, 2, 3 can be housed on an inner side of the cover 300, 1300, 2300. As another alternative, three lubrications can be used: a lubrication can be compatible with a grease slinger 50 on one side of the bearing assembly 40; When the bearing assembly 40 comprises bearing seals 41, 42, another lubrication can be used to lubricate the bearing assembly 40; Then, yet another lubrication can be supplied through the cover 300, 1300, 2300 on the release bearing assembly 1, 2, 3 for the purpose of lubricating an axle such as the transmission axle or an input shaft coupling to the transmission axle.

The covers 1300, 2300 of release bearing assemblies 2 & 3 can comprise two parts: a base and a lid. The cover 1300, 2300 can comprises a substrate 1333 and a grease lid 1360, 1361. The substrate 1333 comprises an upper surface 1303, a main body 1382 comprising a branched grease pathway, a locating side 1386, 1385 comprising a grease supply port 1341, and a lubricating side 1388, 1387 comprising a plurality of grease ports 1310. The grease lid 1360, 1361 constrains the branched grease pathway and is configured so that when grease enters the locating side grease supply port 1341, the grease traverses the branched grease pathway and exits the grease ports 1310. The branches 1311 of the branched grease pathway are configured to direct grease received from the grease path to the grease ports 1310.

Figure 3:
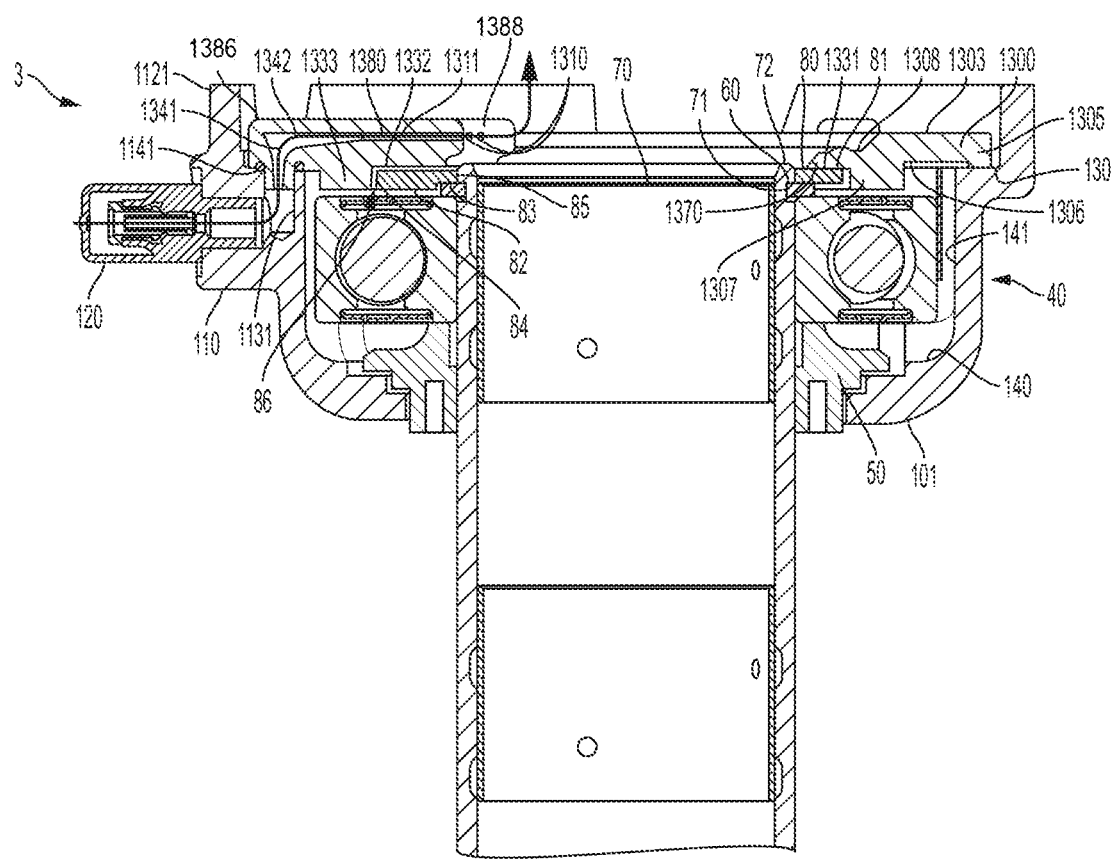
FIG. 3 is a view of an alternative release bearing assembly.
Figure 4:
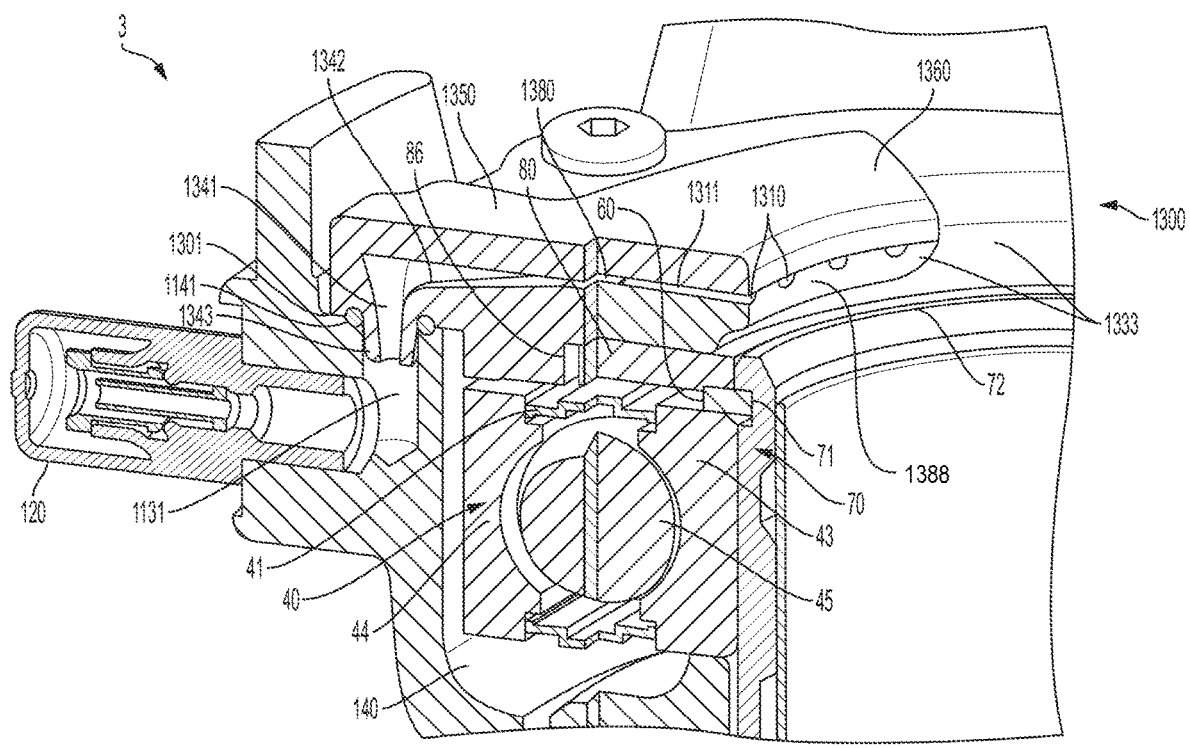
FIG. 4 is a section view of the release bearing assembly of FIG. 3.
Figure 11:
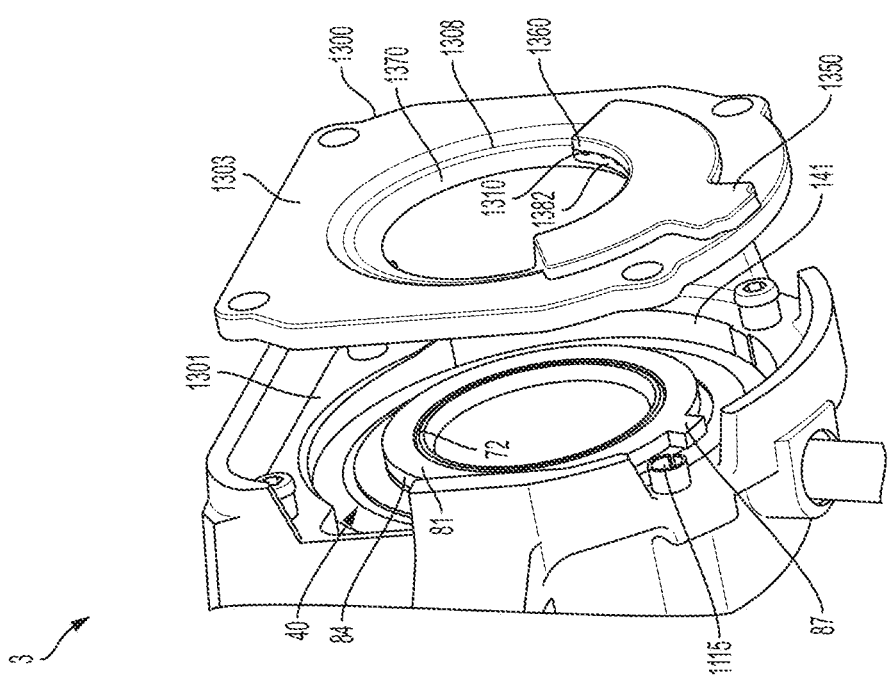
FIG. 11 is an exploded view of the release bearing assembly of FIG. 10.

In the cover 3 of FIGS. 3, 4, & 11, the lid 1360 is of limited extent. As seen in FIG. 11, a "Y" shaped structure covers the branched grease pathway in the upper surface 1303 of main body 1382 and the grease port 1341. The funnel 1342 and grease port 1341 is constrained by the lug portion 1350 of the lid 1360, and the trough 1380 and the branches 1311 are constrained by the arched remainder of the lid 1360. The lid 1360 can be sonically welded or otherwise affixed, bonded, sealingly secured or fused to main body 1382 of the base 1333.

Figure 5:
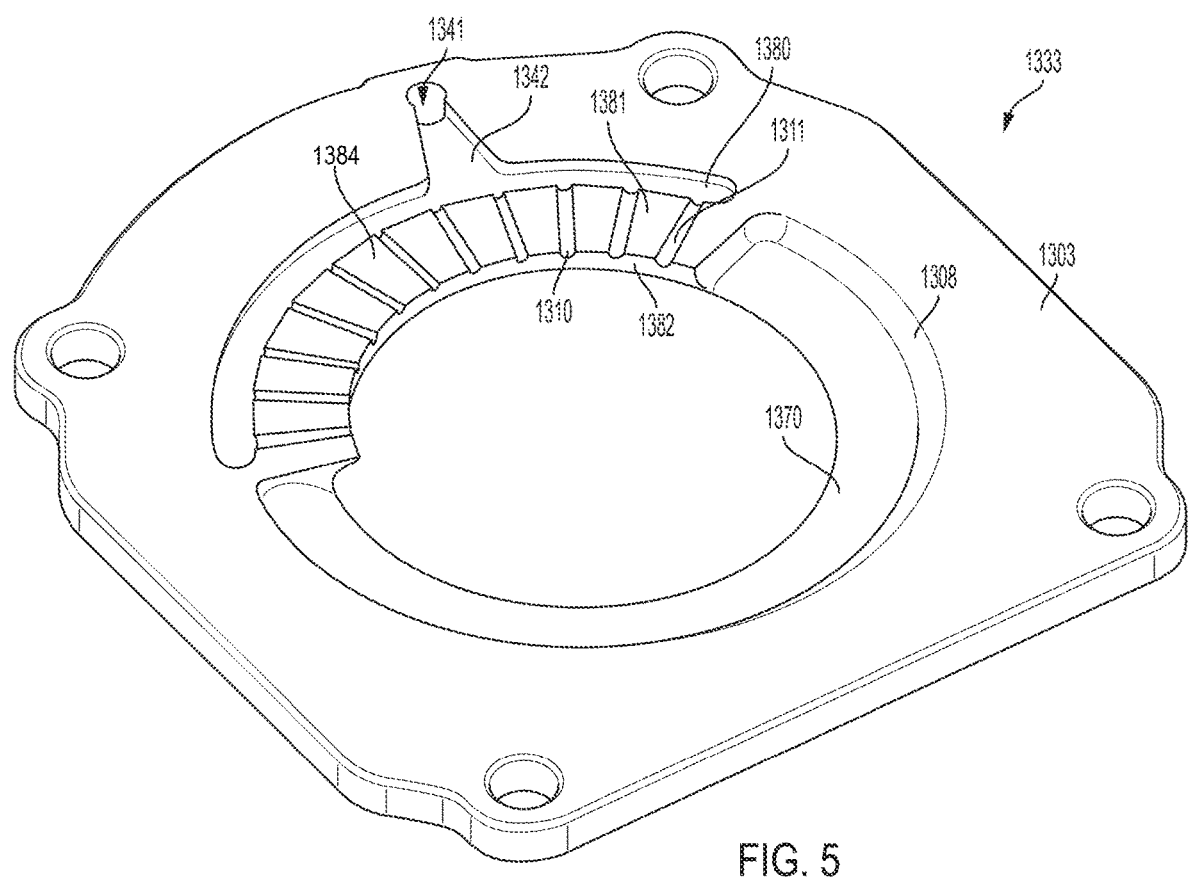
FIG. 5 is a view of a release bearing cover base.
Figure 6:
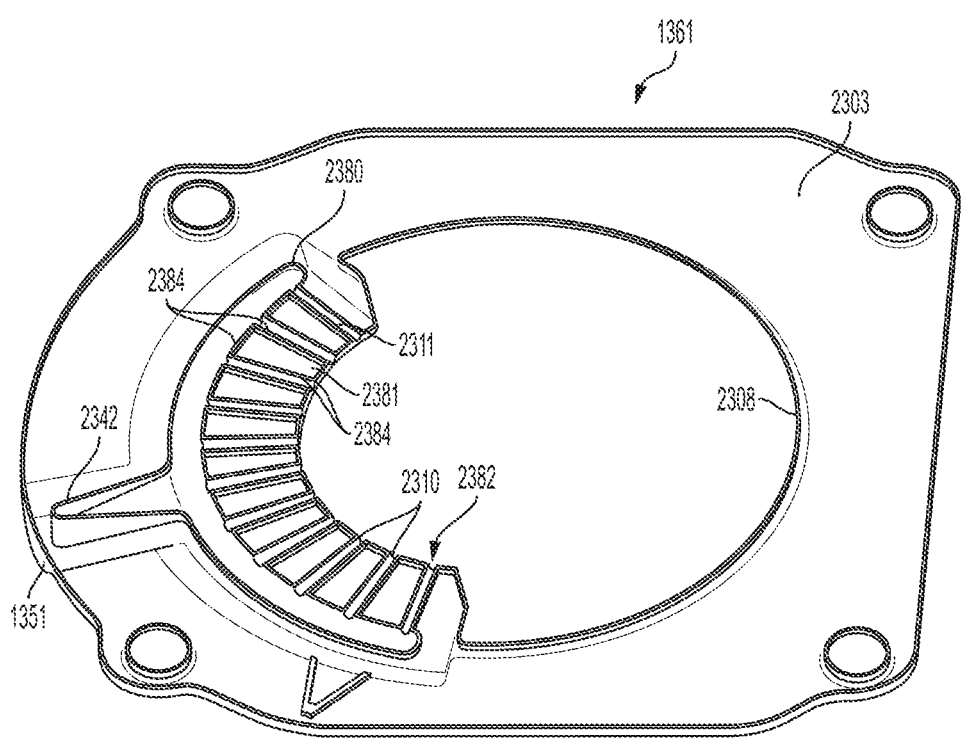
FIG. 6 is a view of a release bearing cover lid.
Figure 7:
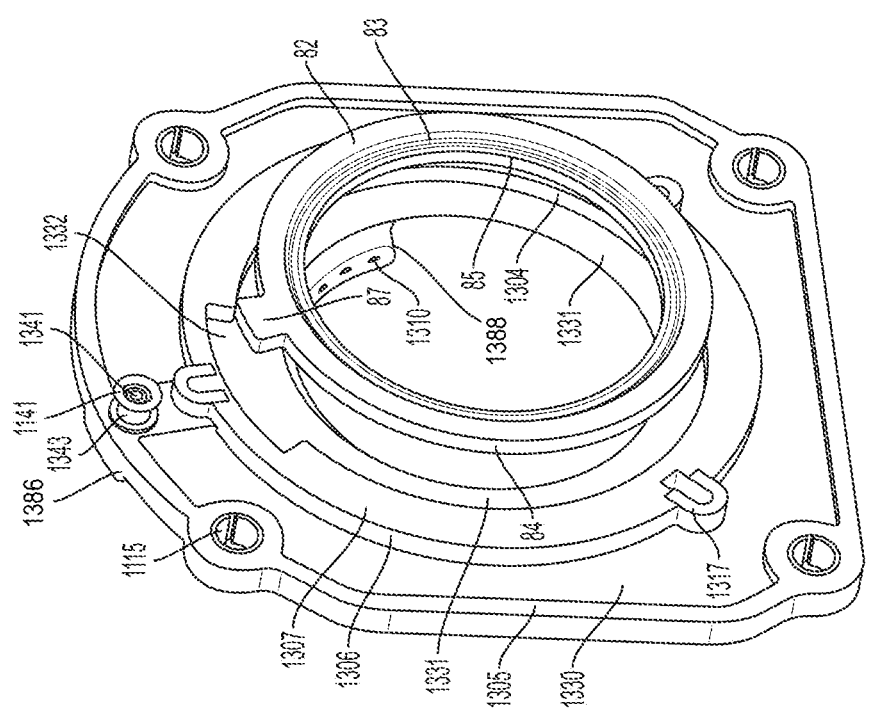
FIG. 7 is an alternative view of the release bearing cover base of FIG. 5.
Figure 8:
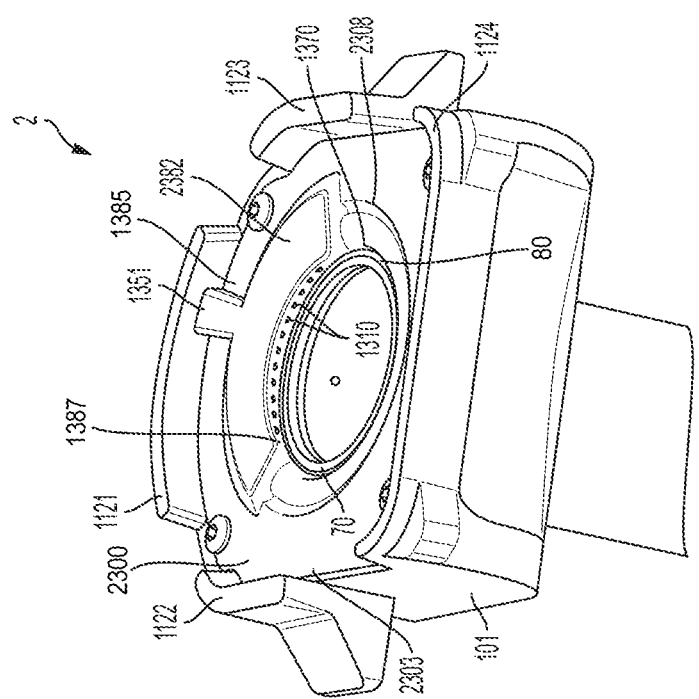
FIG. 8 is an alternative view of the alternative release bearing assembly.

The base of FIG. 5 can be common to both covers 2, 3. The branches 1311 can be recesses in main body 1382 and islands 1384 can project from the main body 1382. Grease in the trough 1380 can be constrained by the islands 1384. The grease lid 1361 of FIG. 6 can mate with the base of FIG. 5 and can comprise aligning features. For example, the grease lid can comprise a substrate 2303 comprising a lid main body 2382. Additional optional aligning features can comprise fastener openings in the substrate 2303 and a seating rim 2308 for seating in or against seating rim 1308 of the base. Grease features can function by their height as grease pressure and distribution control and can augment the grease handling capacity of the cover 2. Alternative or additional grease features can comprise a lid grease neck 1351, a lid grease funnel 2342, a lid grease trough 2380, and mating branches 2311 for forming a branched grease pathway in the lid main body 1382. The islands 1384 of the base can mate with sills 2384 in windows 2381 of the lid to form the channels for branches 2311. Corresponding grease ports 2310 can expel grease to the lubricating side 1387 of the cover 2. The mating branched grease pathway in the lid 1361 is coupled to the main body branched grease pathway to form cover 2. The lid 1361 can be sonically welded or otherwise affixed, bonded, sealingly secured or fused to the base 1333. As an alternative, the grease lid 1361 or 360 can be integrally formed with the base to form release bearing cover, as by 3-D printing or other techniques such as injection molding.

In FIG. 1, a thick arrow shows a lubrication flow path. A lubrication such as an axle grease can be injected via an injection nozzle 120 to a connection 110 having a pathway 111. The grease can travel through a grease path 113 in the release bearing housing 100. The grease can travel under the cover 300 and exit from a gap 301 between the cover 300 and the release bearing sleeve 70 to lubricate the axle. The grease can backflow to contact the bearing seals 41, 42. The grease can also be slung by slinger 50. The grease can be injected at service intervals.

In FIG. 3, a thick arrow shows a lubrication flow path for cover 1300. The flow path of FIG. 3 is constrained and similar to that shown for cover 2300. Grease can be injected via injection nozzle 120 and can travel through a grease pathway. The pathway can be a path 111 through the connection 110, or a grease path 1131 through the housing 100, 101, or both. Cover can comprise a grease supply port 1341 in a nipple 1343. The nipple 1343 can press-fit or otherwise fit in the grease supply port 1341 and can be surrounded by an o-ring 1141 to ensure no grease leaks. The grease supply port can be perpendicular to the branched grease pathway The grease can travel up the grease supply port 1341 and can be distributed along a branched grease pathway. The branched grease pathway can comprise a grease funnel 1342 connected to an intersecting grease trough 1380. The grease trough 1380 can extend at least partially around the cover 1300 to distribute grease to branch pathways 1311 leading to grease ports 1310.

As seen in FIGS. 1, 3, 4, 8, 10 & 11, a release bearing assembly 1, 2, 3 comprises a cover 300, 1300, 2300. A bearing housing 100, 101 comprises a connection 110 and a pathway. The pathway can be a path 111 through the connection 110, or a grease path 113, 1131 through the housing 100, 101, or both, for connecting to an injection nozzle 120. A bearing assembly 40 is within the bearing housing 100, 101. A grease supply port 1341 of the cover 1300, 2300 connects to the connection pathway. The cover 300, 1300, 2300 seals the bearing assembly 40 within the bearing housing 100, 101 so that when the grease enters the locating side grease supply port 1341 and exits the grease ports 1310, the grease does not lubricate the bearing assembly.

The release bearing assembly 1, 2, 3 can comprise a release sleeve 70 through the release bearing 40. The release sleeve 70 can accept a transmission axle, an input shaft, or other shaft for rotation. The release sleeve 70 can comprise a release lip 72 that can abut and seal against the inner diameter 85 of the washer seal 80. In the case of an actuatable clutch, the release bearing assembly 1, 2, 3 can be part of the clutch release bearing assembly. When the axle or other shaft passes through the cover, and when the grease exits the grease ports 1310, the grease lubricates the axle.

A locating ring 60 or other assembly ring or retaining ring is anchored in a groove 71 in the release sleeve 70. The locating ring 60 can restrict motion of the bearing assembly 40 within the bearing housing 100, 101. The washer seal 80 can comprises a circumferential relief 83 for abutting the locating ring 60.

The bearing assembly 40 can comprise a bearing lubrication to lubricate the balls 45 that slide in races 43, 44. Bearing seals 41, 42 can seal the bearing lubrication in the bearing assembly 40 by spanning the races 43, 44. Outer race 44 can abut bearing housing 101, 101 as part of a stationary assembly, while balls 45 and inner race 43 can be subject to rotation as part of a rotating assembly. A slinger assembly 50 can mounted in the bearing housing 100, 101 against the rotating assembly. The slinger assembly 50 can comprise pockets and a slinger lubrication different from the bearing lubrication and the grease, and the slinger can rotate to sling the slinger lubrication. The cover and lubrications can be configured to that the axle grease exiting the grease ports 1310 does not contaminate the bearing lubrication or the slinger lubrication.

Figure 2:
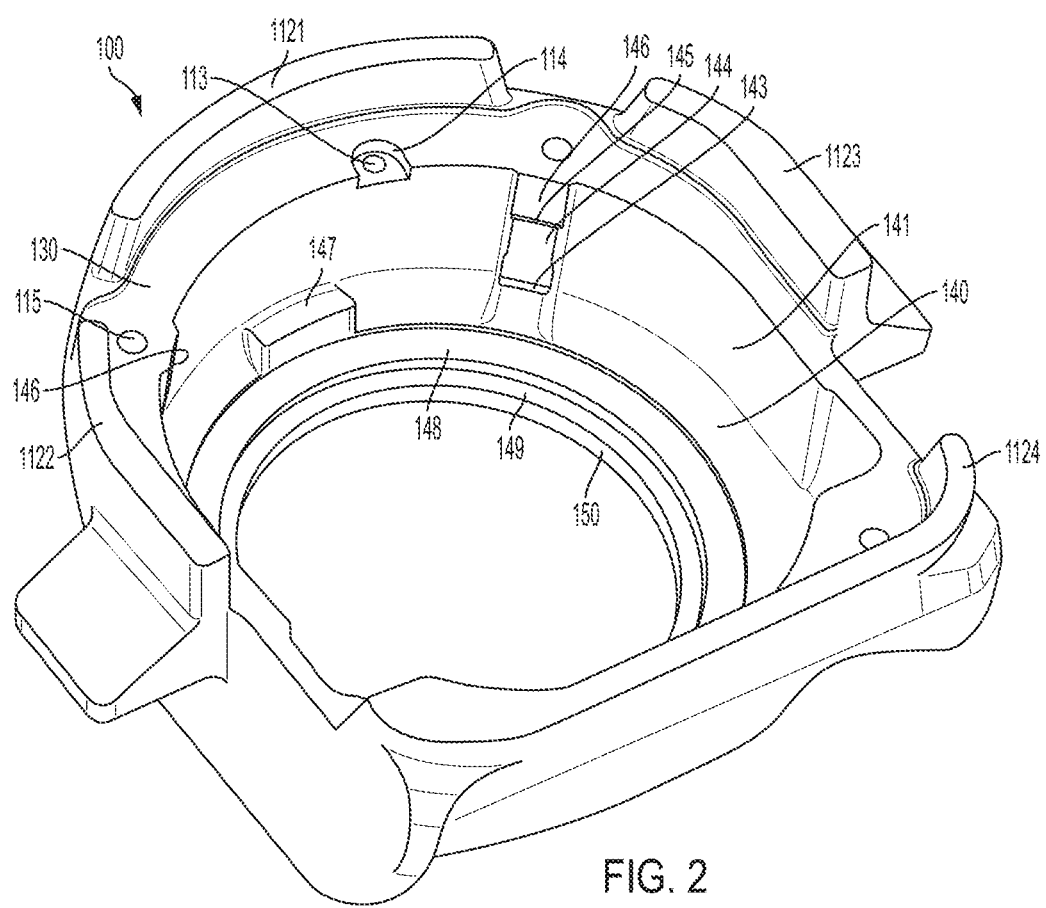
FIG. 2 is a view of a release bearing housing.
Figure 9:
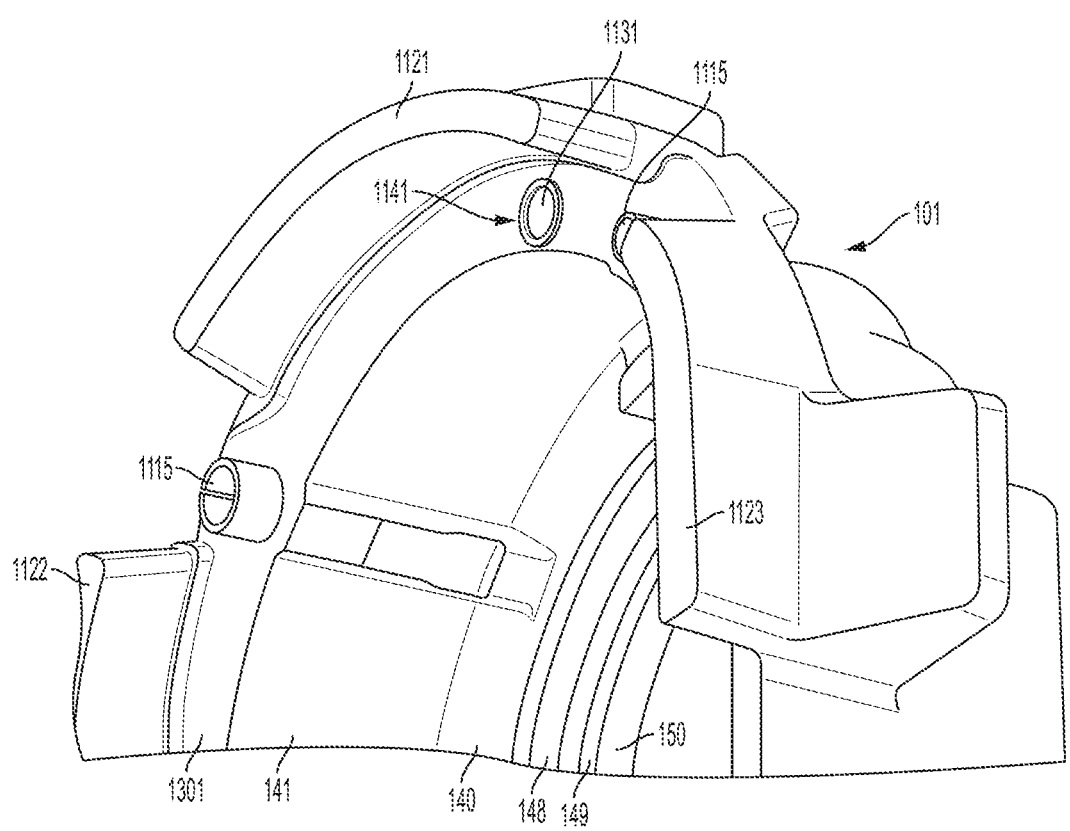
FIG. 9 is a section view of an alternative release bearing housing.
Figure 10:
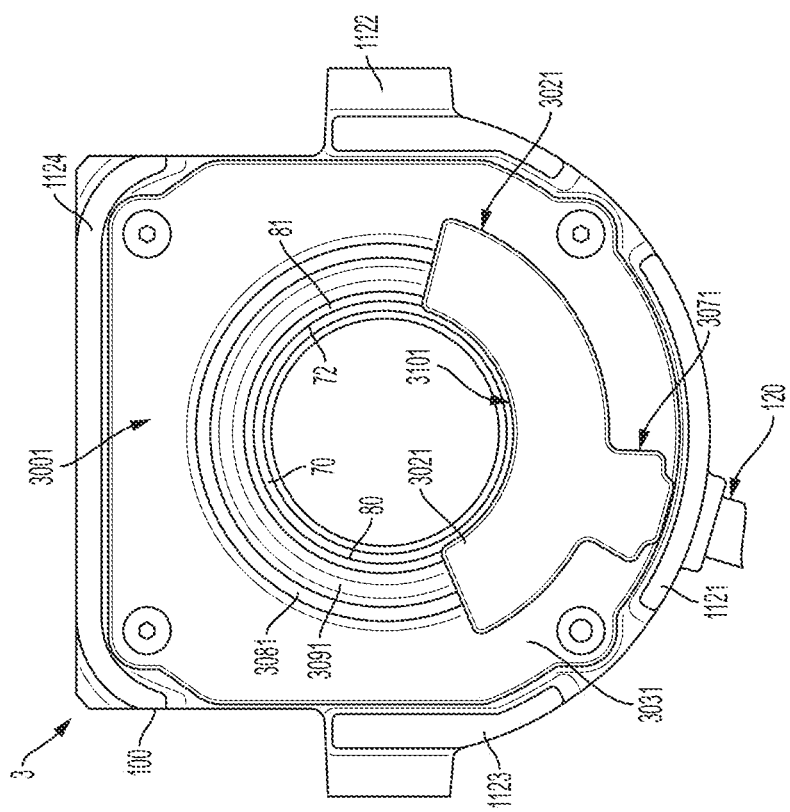
FIG. 10 is a view of another alternative release bearing assembly.

The bearing housings 100, 101 can comprise a variety of features in common to FIGS. 2 & 9. For example, stand-offs 1121, 1122, 1123, 1124 can be included to space the bearing housing with respect to another structure, such as a clutch or transmission. An inner bore 150 and seating steps 148, 149 can receive portions of the slinger assembly 50. While the slinger assembly 50 can provide a spacer characteristic, an additional spacer step 147 can be included in the bearing housing 101, 100 to set a location for the bearing assembly. Additional steps and ledges 143-146 can be included to likewise set a height for the bearing assembly 40, or provide a circumference change to radially set the bearing assembly 40. When a lubrication fills the interior wall 141 and base 140, the steps and ledges 143-146 act as spacers to permit room for the lubrication. An upper rim 130 can be provided to receive the cover 300, 1300, 2300.

The bearing housings 100, 101 can differ in the area surrounding grease paths 113, 1131. In FIG. 2, grease path 113 is surrounded by, and rim 130 comprises, a recess 114. Recess 114 can be a horseshoe shape or other cut-out to facilitate the dispersion of grease under the cover 300. Recess 114 is omitted from rim 1301 in FIG. 9. In FIG. 9, an o-ring is included to facilitate transfer of grease from the bearing housing 101 to the grease port 1341 in nipple 1343. It is possible to include an o-ring in a recess, as an alternative.

Since the cover 300, 1300, 2300 can be screwed, riveted, or otherwise fastened to the bearing housing, the bearing housing comprises exemplary pilots 115 for receiving fasteners. Shims 1115 are also shown. And, it is also possible to use feet. The locating side of the release bearing cover can comprise one or more feet 1317 to axially locate the bearing cover 1300 with respect to the bearing housing, and it is possible to include the feet 1317 as an alternative on the rims 130, 1301. The feet can be adjusted based on application to set the height of the cover with respect to the bearing assembly 40.

The release bearing assembly 2, 3 can further comprise a washer seal 80 between the bearing assembly 40 and the release bearing cover 1300, 2300. Either cover 1300, 2300 can comprise an upper side 1303 and a lower side 1330. The lower side 1330 can comprise a number of features, including a locating outer edge 1305 for abutting the rim 130, 1301, locating feet 1317, and neck 1307. Neck 1307 can surround a central opening 1370, and central opening 1370 can surround release sleeve 70. Central opening 1370 may not sealingly abut release sleeve 70, which can permit grease exiting grease ports 1310 to leak back into the release bearing housing 100, 101. Separating the grease from the lubrication within the release bearing assembly 2, 3 is desired, so the washer seal 80 between the bearing assembly 40 and the release bearing cover 1300, 2300 can seal against the central opening 1370, the locating ring 60, and the lower side 1330.

The neck 1307 can protrude from the lower side 1330. Outer diameter 1306 can recede from inner wall 141 to permit room for optional housing lubrication or clearance space. Lower side neck 1307 can comprise an inner diameter 1304 adjoining a receded positioning slot 1331 for receiving the washer seal 80. The lower side can also comprise a receded locating slot 1332. The washer seal 80 can comprise a drive lug 87 for locating the washer seal 80 with respect to the locating slot 1332. The locating slot 1332 can extend circumferentially in the neck 1307 for a greater extent than the width of the drive lug 87 to permit light weighting and easy drop-in assembly with low alignment tolerances. Locating slot 1332 can extend, for example 280 degrees around lower side 1330 of cover 1300, 2300.

Washer seal can comprise a cover side 81 for abutting the lower side 1331 in the area near the central opening 1370, an inner diameter 85 for abutting the release sleeve 70, a bearing side 82 facing bearing assembly 40, and an outer diameter 84 facing the inner diameter 1304 of neck 1307. Bearing side 82 can comprise a circumferential relief 83 for abutting and sealing against the locating ring 60. Washer can comprise additional features for seating against bearing seal 41. A washer gap 86 can exist between the outer diameter 84 of the washer seal 80 and the inner diameter 1304 of neck 1307.

The washer seal 80 can be visible between the release sleeve 70 and the central opening 1370. The washer seal 80 can be a distinctly different color than the bearing cover 1300, 2300 so as to be visible and obvious to the clutch assembler and the mechanic installing the clutch. The washer seal 80 can fit tightly on the release sleeve 70. Any relative motion of the washer seal 80 with respect to the cover 1300, 2300 and bearing assembly 40 during operation of the release bearing assembly 2, 3 can be limited to motion between the Inner Diameter (ID) 85 of the washer seal and the outer diameter (OD) of the release sleeve 70.

After an initial motion to abut one of the outer limits of the locating slot 1332, the washer seal 80 is prevented from rotating with the release sleeve 70 via the drive lug 87 (locating tab). The positioning slot 1331 is shown to enclose the main body of the washer seal 80, and the locating slot is shown to have a narrow range for catching the drive lug 87. But, the locating slot 87 can comprise a larger extent of 280 Degrees around the release sleeve 70.

The washer seal 80 allows for concentricity irregularities in the assembly process along with any eccentric motion during the release bearing assembly operation, as during clutch operation. The washer seal 80 blocks any grease from migrating into the release bearing housing 100, 101. The bearing seals 41, 42 are not exposed to grease that is injected via injection nozzle 120 to lubricate an axle passing through the release sleeve, such as an axle coupling to a transmission.

Turning to the cover of FIG. 1, a release bearing assembly 1 comprises a bearing housing 100 comprising a pathway formed by paths 111 & 113 and recess 114. A bearing assembly 40 is within the bearing housing 10. A release bearing cover 300 encloses the bearing assembly 40 within the bearing housing 100. The release bearing cover 300 comprises a substrate 307 comprising a lid extension 302, an upper side 303, and a lower side 307. A grease pathway can be formed in the lower side 307 and can comprise a series of one or more steps 304 and recesses 306 to form a stepped grease pathway. The lower side 307 can comprise a number of features, including a locating outer edge 305 for abutting the rim 130 locating feet, standoffs, spacers, or the like for positioning the cover 300 with respect to the bearing assembly 40 and bearing housing 100.

A grease gap 301 can be formed between the lid extension 302 and the bearing assembly 40. The grease gap 301 can be formed between the release sleeve 70 and the lid extension. The release bearing cover 300 is configured so that, when grease is supplied to the pathway formed by paths 111 & 113, the grease traverses the grease pathway and exits the grease gap 301. As an option, when there is space in the bearing housing 100, and when the grease is supplied to the pathway, the grease can surround the bearing assembly 40 in the bearing housing 100. As another alternative, the release bearing assembly can further comprise a slinger assembly 50 in the bearing housing 100, and, when the grease is supplied to the pathway, the grease lubricates the slinger assembly 50 in the bearing housing 100.

Other implementations will be apparent to those skilled in the art from consideration of the specification and practice of the examples disclosed herein.

What is claimed is:

1. A cover, comprising:
    a substrate comprising:
        a main body comprising a branched grease pathway;
        a locating side comprising a grease supply port; and
        a lubricating side comprising a plurality of grease ports; and
    a grease lid constraining the branched grease pathway and configured so that when grease enters the locating side grease supply port, the grease traverses the branched grease pathway and exits the grease ports.

2. The cover of claim 1, wherein the branched grease pathway further comprises a grease funnel in fluid communication with the grease port.

3. The cover of claim 1, wherein the grease supply port is perpendicular to the branched grease pathway.

4. The cover of claim 1, further comprising a grease trough intersecting the branched grease pathway.

5. The cover of claim 4, wherein the grease trough extends at least partially around the cover.

6. The cover of claim 1, wherein the substrate comprises an upper side and a lower side, and wherein the lower side further comprises a positioning slot for receiving a washer seal.

7. The cover of claim 1, wherein the grease lid comprises lid main body and a mating branched grease pathway in the lid main body, and wherein the mating branched grease pathway is coupled to the main body branched grease pathway.

8. A release bearing assembly, comprising:
    a bearing housing comprising a connection and a pathway through the connection for connecting to an injection nozzle;
    a bearing assembly within the bearing housing; and
    a release bearing cover comprising the cover of claim 1, wherein the grease supply port connects to the connection pathway, and wherein the cover seals the bearing assembly within the bearing housing so that when the grease enters the locating side grease supply port and exits the grease ports, the grease does not lubricate the bearing assembly.

9. The release bearing assembly of claim 8, further comprising a washer seal between the bearing assembly and the release bearing cover.

10. The release bearing assembly of claim 9, wherein the substrate comprises an upper side and a lower side, and wherein the lower side further comprises a positioning slot for receiving the washer seal.

11. The release bearing assembly of claim 10, wherein the lower side of the comprises a locating slot, and wherein the washer seal comprises a drive lug for locating the washer seal with respect to the locating slot.

12. The release bearing assembly of claim 9, further comprising a release sleeve through the bearing assembly, and wherein the washer seal seals against the release sleeve and against the release bearing cover.

13. The release bearing assembly of claim 12, further comprising a locating ring anchored to the release sleeve, the locating ring restricting motion of the bearing assembly within the bearing housing, wherein the washer seal further comprises a circumferential relief for abutting the locating ring.

14. The release bearing assembly of claim 9, further comprising an axle passing through the cover, wherein, when the grease exits the grease ports, the grease lubricates the axle.

15. The release bearing assembly of claim 9, further comprising a bearing lubrication in the bearing assembly.

16. The release bearing assembly of claim 15, wherein the bearing assembly comprises bearing seals to seal the bearing lubrication in the bearing assembly.

17. The release bearing assembly of claim 16, further comprising a slinger assembly mounted to the bearing housing, the slinger assembly comprising a slinger lubrication different from the bearing lubrication and the grease, wherein the cover is configured so that the grease does not contaminate the bearing lubrication or the slinger lubrication.

18. A release bearing assembly, comprising:
a bearing housing comprising a pathway;
a bearing assembly within the bearing housing; and
a release bearing cover enclosing the bearing assembly within the bearing housing, the release bearing cover comprising:
a substrate comprising a lid extension, an upper side, and a lower side; and
a grease pathway in the lower side; and
a grease gap between the lid extension and the bearing assembly,
wherein the release bearing cover is configured so that, when grease is supplied to the pathway, the grease traverses the grease pathway and exits the grease gap.

19. The release bearing assembly of claim 18, wherein, when the grease is supplied to the pathway, the grease surrounds the bearing assembly in the bearing housing.

20. The release bearing assembly of claim 18, further comprising a slinger assembly in the bearing housing, wherein, when the grease is supplied to the pathway, the grease lubricates the slinger assembly in the bearing housing.

* * * * *